United States Patent Office 2,981,732
Patented Apr. 25, 1961

2,981,732

PROCESS FOR THE PREPARATION OF 6-METHYL-5-ENE-STEROIDS

David Neville Kirk, Vladimir Petrow, and Marianne Helen Thomson, London, England, assignors to The British Drug Houses Limited, London, England, a British company No Drawing. Filed Jan. 8, 1959, Ser. No. 785,581

Claims priority, application Great Britain Jan. 16, 1958

11 Claims. (Cl. 260—239.55)

This invention is for improvements in or relating to organic compounds and has particular reference to a method for the preparation of steroidal derivatives possessing the 3β-hydroxy-6-methyl-5-ene or 3β-acyloxy-6-methyl-5-ene or 3β-aroyloxy-6-methyl-5-ene systems.

It is an object of the present invention to provide a method for the preparation of 3β-hydroxy-6-methyl-5-enes and the corresponding 3-acyloxy- and 3-aroyloxy derivatives which are of value as intermediate compounds in the preparation of steroid hormones with valuable biological properties.

In particular it is an object of the invention to provide a method for the preparation of 6-methyl derivatives of diosgenin, 3β:20β - dihydroxypregn - 5 - ene, 3β:17β-dihydroxyandrost-5-ene, cholesterol and stigmasterol.

6-methyl-diosgenin

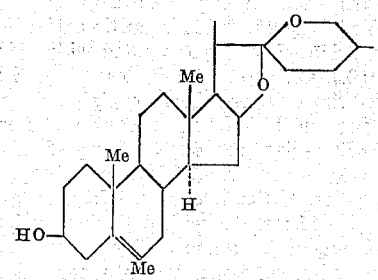

is a starting material for the preparation of 6-methyl steroid hormones which frequently show significantly greater biological activity than the unmethylated compounds. Thus it can be degraded by methods applied by prior art to diosgenin to yield 6-methylpregnadieneolone, 6-methylpregnenalone, 6-methylprogesterone and 6-methyl-dehydroisoandrosterone which can then be converted by conventional methods to such biologically active compounds as 6α-methylprogesterone, 6-methylandrostanolone, and 6α-methylethisterone, which are superior to the corresponding 6-desmethyl compounds.

6-methyl-3β:20β-dihydroxypregn-5-ene

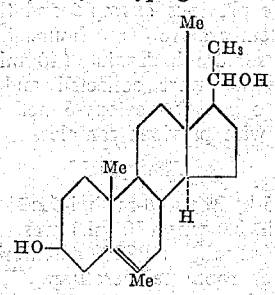

is an intermediate for 6-methyl progresterone into which it may be converted by Oppenauer oxidation and which is itself progrestational in effect and is useful for preparation of 6-methyl corticoid hormones.

6-methyl-3β:17β-dihydroxyandrost-5-ene

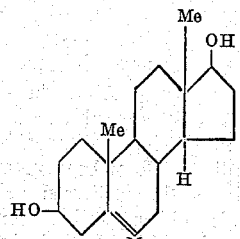

can be converted to progestationally active substances such as 6α-methylethisterone (6α-methyl-17β-hydroxy-17α-pregn-4-en-20-yne-3-one) and 6α:21-dimethylethisterone, (6α:21-dimethyl-17β-hydroxy-17α-pregn-4-en-20-yne-3-one) by the application of conventional methods previously employed in the 6-desmethyl series, the resulting products being superior in biological activity to the corresponding 6-desmethyl compounds.

6-methylchloesterol and 6-methylstigmasterol

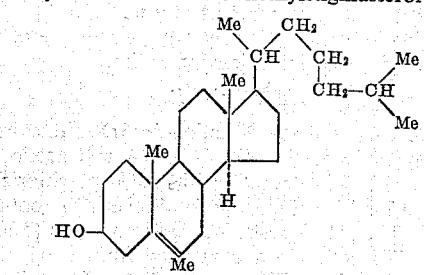

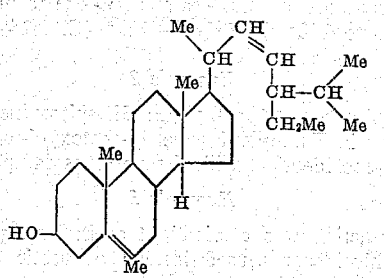

are general starting materials for 6-methyl hormones.

6-methyl-3β:20β-dihydroxypregn-5-ene and 6-methyl-stigmasterol and their 3β-acyl and 3β-aroyl derivatives are new chemical compounds.

According to the present invention there is provided a process for the preparation of 3β-acyloxy-, and 3β-aroyloxy-6-methyl-Δ⁵-steroids from the corresponding 3β:5α-dihydroxy, 3β-acyloxy-5α-hydroxy-, or 3β-aroyloxy-5α-hydoxy-6β-methylsteroids, which process comprises treating the appropriate 3β:5α-dihydroxy-6β-methyl-steroid, or the corresponding 3β-acyloxy or 3β-aroyloxy derivative having the formula

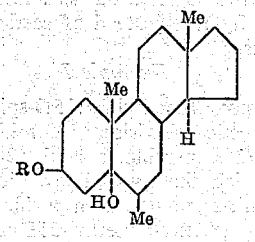

where R is hydrogen or an acyl or aroyl group containing up to 10 carbon atoms with an acidic catalysts in an acylating agent.

The resulting 3β-acyloxy or 3β-aroyloxy-6-methyl-Δ⁵-steroid may be converted into the 3β-hydroxy-6-methyl- $\Delta^5$-steroid by methods well known to those skilled in the art, such as alkaline hydrolysis.

The acidic catalyst in the acylating agent may be mixed with a diluent such as the acid corresponding to the acylating agent.

Acetic anhydride is the preferred acylating agent but other anhydrides such for example as propionic anhydride and succinic anhydride may be used; isopropenyl acetate and acid chlorides such as benzoyl chloride and acetyl chloride may also be used.

Acetic acid is the preferred diluent, but other diluents such as ethylene dichloride or benzene may be employed.

Perchloric acid is the preferred acidic catalyst but toluene-p-sulphonic acid, as well as Lewis acids such as boron trifluoride, zinc chloride and aluminium chloride may also be employed.

The reaction may be carried out at any temperature between the freezing-point of the solution and 100° C. and is generally most conveniently performed at or about room temperature, though a higher temperature may be desirable when a Lewis acid is used. The product may be isolated by usual procedures such as, for example, by pouring the reaction mixture into water and collecting the precipitated solids, or by extraction with a suitable solvent such as ether or benzene.

Following is a description by way of example of methods of carrying the invention into effect.

*Example 1*

3β-acetoxy-5-hydroxy-6β-methyl-5α:5D-spirostane (2 g.) suspended in acetic acid (40 ml.) and acetic anhydride (5 ml.) was treated with 72% perchloric acid solution (0.2 ml.) and stirred for ½ hour at room temperature. The solution was poured into water (500 ml.) and the solids collected and purified from ethyl acetate. 3β-acetoxy-6-methyl-25D-spirost-5-ene formed prisms, M.P. 215 to 218° C., $[\alpha]_D^{24}$ —129° (C. 0.24 in chloroform).

*Example 2*

3β:5-dihydroxy-6β-methyl-5α:25D-spirostane (2 g.) treated as in Example 1 gave 3β-acetoxy-6-methyl-25D-spirost-5-ene identical with the previous sample.

*Example 3*

The reaction was carried out as in Example 1 only acetyl chloride was used instead of acetic anhydride, with identical results.

*Example 4*

The reaction was carried out as in Example 1, using formic acid instead of acetic acid, with identical results.

*Example 5*

Propionic acid and anhydride were substituted for acetic acid and anhydride in Example 1. 3β-acetoxy-6-methyl-25D-spirost-5-ene, identical with previous samples, was obtained.

*Example 6*

The reaction was carried out as under Example 1, using succinin anhydride instead of acetic anhydride, with identical results.

*Example 7*

3β:5-dihydroxy-6β-methyl-5α:25D-spirostane (10 g.) suspended in acetic anhydride (100 ml.) was stirred and treated with 72% perchloric acid (2 drops) for 1½ hours after which the crystalline solids were collected and washed with methanol, then purified from ethyl acetate to give 3β-acetoxy-6-methyl-25D-spirost-5-ene identical with previous samples.

*Example 8*

3β-acetoxy-5-hydroxy-6β-methyl-5α:25D-spirostane (2 g.) suspended in isopropenyl acetate (25 ml.) was treated with 72% perchloric acid (2 drops). After ½ hour ether was added and the solution was washed neutral and the solvents removed. 3β-acetoxy-6-methyl-25D-spirost-5-ene, identical with previous samples, was obtained after purification from ethyl acetate.

*Example 9*

3β-acetoxy-5-hydroxy-6β-methyl-5α:25D-spirostane (2 g.) suspended in acetic acid (40 ml.) and acetic anhydride (5 g.) was treated with toluene-p-sulphonic acid (0.5 g.) and stirred for 4 hours. The product, isolated as in Example 1, was 3β-acetoxy-6-methyl-25D-spirost-5-ene, identical with previous samples.

*Example 10*

Boron trifluoride etherate (1 ml.) was substituted for toluene-p-sulphonic acid (see Example 9), and the mixture was stirred for 24 hours. The product was 3β-acetoxy-6-methyl-25D-spirost-5-ene, identical with previous samples.

*Example 11*

3β:17β-diacetoxy-5αhydroxy-6β-methylandrostane (1.1 g.) was dissolved in acetic acid (20 ml.) and acetic anhydride (5 ml.) containing 72% perchloric acid (1 drop). After 15 minutes the solution was poured into water, and the precipitated solids collected and purified from methanol to give 3β:17α-diacetoxy-6-methylandrost-5-ene in crystals, M.P. 125 to 127° C., not depressed in admixture with an authentic sample; $[\alpha]_D^{22}$+76° (c. 0.42 in chloroform).

*Example 12*

3β:5α:20β-trihydroxy-6β-methylpregnane (1.4 g.), prepared as disclosed in copending application Ser. No. 587,447, filed May 28, 1956, in acetic acid (28 ml.) and acetic anhydride (7 ml.) was treated with 72% perchloride acid (0.1 ml.) for 20 minutes, when the solution was poured into water. The precipitated solids were collected and purified from aqueous methanol (75%) to give 3β:20β-diacetoxy-6-methylpregn-5-ene in M.P. 155° C., $[\alpha]_D^{22}$ —45° (c. 0.36 in chloroform).

Saponification of the foregoing 3:20-diacetate (0.4 g.) by heating for 45 minutes with potassium hydroxide (0.4 g.) in 90% aqueous methanol (15 ml.) gave 3β-20β-dihydroxy-6-methyl-pregn-5-ene, which separated from acetone/hexane (1:2) flakes, M.P. 207 to 208° C., $[\alpha]_D^{24}$ —74° (c. 0.42 in chloroform).

*Example 13*

3β-acetoxy-5-hydroxy-6β-methyl-5α:25D-spirostane (2 g.) suspended in acetic acid (40 ml.) and benzoyl chloride (2 ml.) was treated with 72% perchloride acid (0.1 ml.) for 2 hours. Precipitation in water and purification from ethyl acetate gave 3β-acetoxy-6-methyl-25D-spirost-5-ene, identical with previous samples.

*Example 14*

Octanoic anhydride (5 ml.) was substituted for benzoyl chloride in the previous example and the mixture was left at room temperature for 6 hours, then poured into a solution of sodium hydroxide (40 ml.) in water (1 litre). The solids were collected and purified from ethyl acetate to give 3β-acetoxy-6-methyl-25D-spirost-5-ene, identical with previous samples.

*Example 15*

3β-acetoxy-5-hydroxy-6β-methyl-5α:25D-spirostane (3 g.) dissolved in benzene (50 ml.) was treated with acetic anhydride (12 ml.) and 72% perchloric acid (1 drop) for 2 hours at room temperature. The solution was then washed with water and sodium bicarbonate solution, and the benzene evaporated. Purification of the residue from chloroform: ethanol (1:4) gave 3β-acetoxy-6-methyl-25D-spirost-5-ene identical with previous samples.

Example 16

1:2-dichloroethane was substituted for benzene in Example 15, with the same result.

Example 17

3β:5-dihydroxy-6β-methyl-5α:25D-spirostane (2 g.) suspended in anhydrous formic acid (65 ml.) was treated with 72% perchloric acid (1 drop). The solid dissolved, and after a few minutes crystalline material separated. This was collected on a filter and purified from chloroform:ethanol (1:5) to give 3β-formoxy-6-methyl-25D-spirost-5-ene in flakes, M.P. 214 to 216° C., $[\alpha]_D^{21}$ —126° (c. 0.33 in chloroform).

Example 18

3β-caproxy-5-hydroxy-6β-methyl-5α:25D-spirostane (1 g.) (see our application No. 765,742) in acetic acid (40 ml.) and acetic anhydride (5 ml.) was stirred with 72% perchloric acid (2 drops) for 1 hour, then poured into water. The resulting gum was extracted with benzene which was washed, dried and evaporated. Purification from ethanol gave 3β-caproxy-6-methyl-25D-spirost-5-ene, M.P. 77 to 79° C., $[\alpha]_D^{23}$ —96° (c. 0.50 in chloroform).

Example 19

3β-acetoxy-5-hydroxy-6β-methyl-5α:25D-spirostane (2 g.) in acetic acid (40 ml.) and acetic anhydride (10 ml.) containing anhydrous zinc chloride (1 g.) was heated to 70° C. for 5 hours then poured into water. The solids were collected and purified from ethyl acetate to give 3β-acetoxy-6-methyl-25D-spirost-5-ene, identical with previous samples.

Example 20

Anhydrous aluminum chloride (1 g.) was substituted for zinc chloride in the previous example, with similar results.

Example 21

3β-benzoyloxy-5-hydroxy-6β-methyl-5α:5D - spirostane (1 g.) in acetic acid (40 ml.) and acetic anhydride (5 ml.) was stirred with 72% perchloric acid (2 drops) for 1 hour and then poured into water. The precipitated solids were purified from methylene chloride:acetone (1:2) to give 3β - benzoyloxy - 6 - methyl - 25D-spirost-5-ene in plates M.P. 188° to 192° C., $[\alpha]_D^{22}$ —80.2° (c. 0.474 in chloroform).

Example 22

3β:5α-dihydroxy-6β-methylchloestane (2 g.) in acetic acid (40 ml.) and acetic anhydride (5 ml.) was stirred with 72% perchloric acid (0.2 ml.) for 1 hour, then poured into water. The solids were collected and purified from methanol to give 3β-acetoxy-6-methylcholest-5-ene in flakes, M.P. 114 to 116° C., $[\alpha]_D^{21}$ —50° (c. 0.24 in chloroform).

Example 23

3β-5α-DIHYDROXY-6β-METHYLSTIGMAST-22-ENE

Stigmasteryl acetate α-epoxide (Fernholz, Ann., 1934, 508, 315) in benzene (600 ml.) was added to a Grignard reagent prepared from magnesium (19.5 g.), methyl iodide (50 ml.) and ether (300 ml.). The mixture was distilled until a vapour-temperature of 70° C. was reached, whereafter the mixture was reflux for 2½ hours, cooled, and the complex decomposed by the addition of aqueous ammonium chloride. The organic layer was washed with dilute mineral acid, then with water, dried and the solvents removed under reduced pressure. The residue was crystallised from ethanol to give plates of 3β:5α-dihydroxy-6β-methylstigmast - 22 - ene, M.P. 170° C., $[\alpha]_D^{20}$ —28° (c. 0.67 in chloroform).

3β:5α-dihydroxy-6β-methylstigmast-22-ene M.P. 170° C., $[\alpha]_D^{23}$ —28° (4 g.) suspended in a mixture of acetic acid (50 ml.) and acetic anhydried (8 ml.) was treated with 3 drops of 72% perchloric acid. The mixture was stirred for 30 minutes, and the crystalline deposit collected and purified from ethanol. 6β-methylstigmasteryl acetate separated in flat needles, M.P. 105 to 107° C. $[\alpha]_D^{20}$ —59° (c. 0.93 in chloroform).

Saponification of the foregoing acetate by the process of Example 13, and purification from ethanol, gave 6-methylstigmasterol, M.P. 133 to 134° C., $[\alpha]_D^{23}$ —49° (c. 0.51 in chloroform).

We claim:

1. A process for the preparation of 3β-acyloxy-6-methyl-Δ⁵-steroids which process comprises reacting the corresponding 5α-hydroxy-6-methyl steroid having in rings A and B the formula

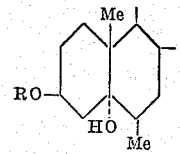

where R is a radical selected from the group consisting of hydrogen and a residue of a carboxylic acid containing up to 10 carbon atoms, with an acidic catalyst selected from the group consisting of perchloric acid, toluene-p-sulphonic acid, and a Lewis acid in an acylating agent containing a residue of a carboxylic acid having up to 10 carbon atoms.

2. A process as claimed in claim 1 wherein said acidic catalyst is perchloric acid.

3. A process as claimed in claim 1 wherein said acidic catalyst is toluene-p-sulphonic acid.

4. A process as claimed in claim 1 wherein said acylating agent is acetic anhydride.

5. A process as claimed in claim 1 wherein said acylating agent is succinic anhydride.

6. A process as claimed in claim 1 wherein said acylating agent is isopropenyl acetate.

7. A process as claimed in claim 1 wherein said acylating agent is benzoyl chloride.

8. A process as claimed in claim 1 wherein said acidic catalyst is mixed with a diluent comprising the acid corresponding to said acylating agent.

9. A process as claimed in claim 8 wherein said diluent is acetic acid.

10. A process as claimed in claim 8 wherein said diluent is ethylene dichloride.

11. A process as claimed in claim 8 wherein said diluent is benzene.

References Cited in the file of this patent

UNITED STATES PATENTS 2,674,605    Miescher et al.     Apr. 6, 1954
2,709,704    Brown     May 31, 1955

OTHER REFERENCES

Zhurnal Obshchei Khimii: vol. 9, pp. 436–441 (1939).
Fieser and Fieser: Natural Products Related to Phenanthrene, 3rd edition 1949, pp. 386–7.
Daus et al.: Chem. Abst., vol. 46, 2557 (1952).
Fieser and Fieser: Steroids, 1959, p. 692.